I. ANDERSON.
DIPPING DEVICE.
APPLICATION FILED JUNE 3, 1921.
1,436,560. Patented Nov. 21, 1922.
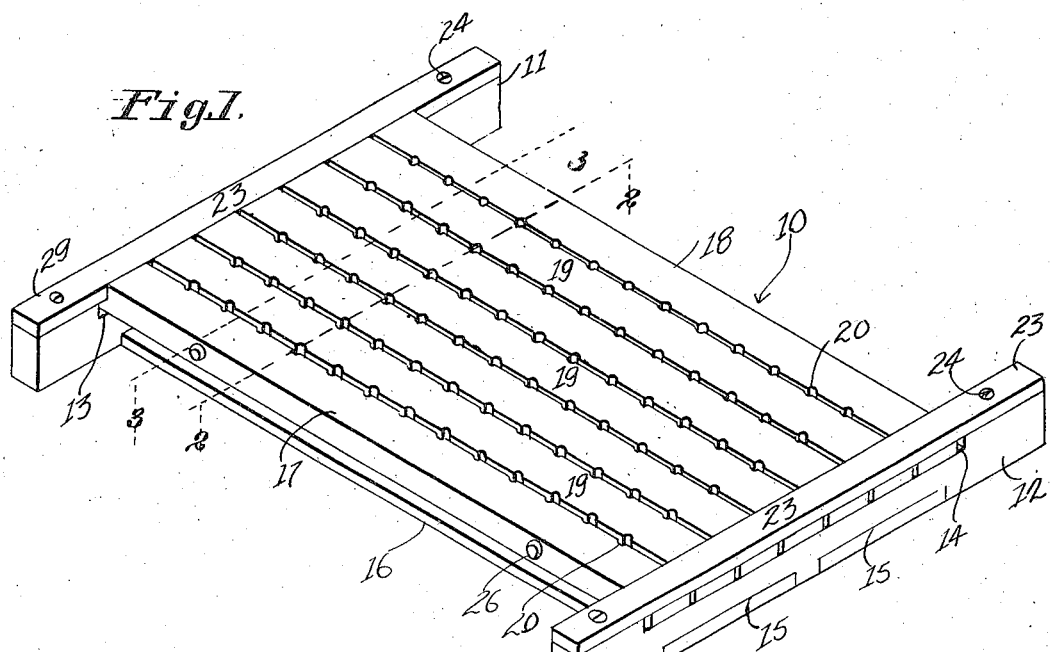
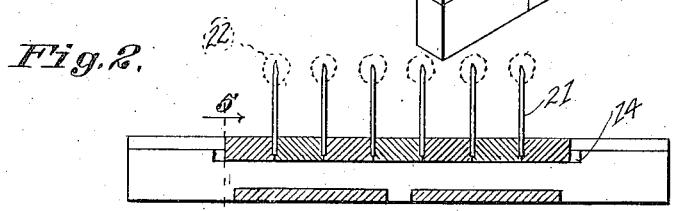
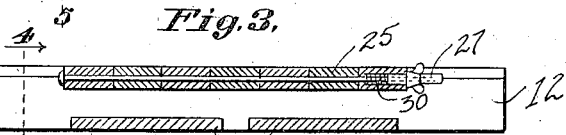
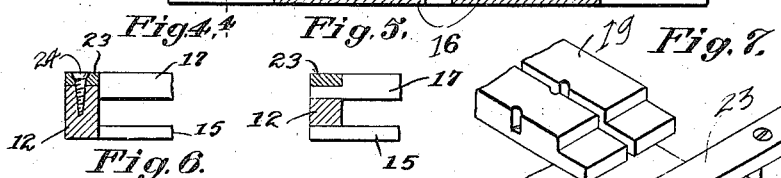
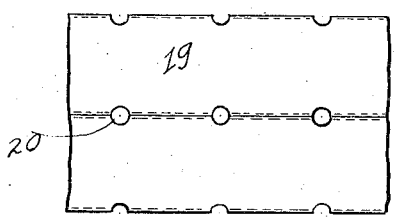
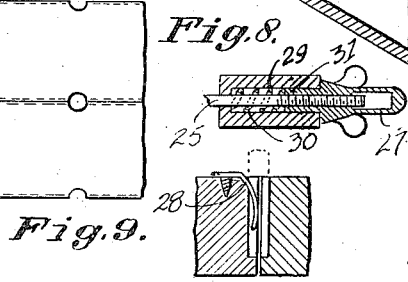
Inventor,
I. Anderson
Victor J. Evans
By
Attorney Patented Nov. 21, 1922.

1,436,560

UNITED STATES PATENT OFFICE.

ISAAC ANDERSON, OF OAKLAND, CALIFORNIA.

DIPPING DEVICE.

Application filed June 3, 1921. Serial No. 474,825.

*To all whom it may concern:*

Be it known that I, ISAAC ANDERSON, citizen of the United States, residing at Oakland, in the county of Alameda and State of California, have invented new and useful Improvements in Dipping Devices, of which the following is a specification.

My invention relates to candy dipping devices and more particularly to that type of dipping devices disclosed in my application, Serial No. 463524, filed April 22nd, 1921.

The principal object of this invention is to provide means for holding in a fixed position in a dipping frame a plurality of candy "sucker" sticks, so that the suckers may be readily dipped into a vat or suitable receptacle for the purpose of coating the candy on the sticks to thereby produce finished articles.

A further object of this invention is to provide means associated with the dipping frame, whereby the sticks may be readily clamped in a fixed position before the dipping action occurs and readily released from the frame after the dipping operation has been completed.

A still further object of this invention is to provide a device of character described, which is simple in construction, also strong and durable, economical to manufacture, and a device which can be easily assembled and disassembled.

In my previously filed application the principle was employed of supporting in a frame a plurality of sticks and then by positive gripping means withdrawing these strips by an extracting frame and then when the sticks were in the said extracting frame subjecting the same to a dipping operation in order to either accumulate on the sticks candy to produce the types of finished articles known as "suckers," or to coat the candy already on the sticks to thereby produce finished coated articles. In the present invention I propose to do away with the two fold operation and employ but a single operation to complete the formation of the finished candied articles.

Other objects and advantages will be apparent during the course of the following description.

In the accompanying drawings forming a part of this application and in which like numerals are employed to designate like parts throughout the same, Fig. 1 is a perspective view of the device, Fig. 2 is a transverse sectional view taken on the line 2—2 of Fig. 1, Fig. 3 is a similar view through the frame, taken on the line 3—3 of Fig. 1, and showing to advantage a cross bolt forming part of my invention, Fig. 4 is a fragmentary sectional view on the line 4—4 of Fig. 3, Fig. 5 is a similar view on the line 5—5 of Fig. 2, Fig. 6 is an enlarged fragmentary plan view showing a pair of strips in close proximity to each other.

Fig. 7 is a perspective view of the strips before their insertion in the one sill of the frame, parts of the frame being shown in section.

Fig. 8 is a sectional detail of the means for holding the end of the bolt in a locked position, and Fig. 9 is an enlarged modified sectional view showing the manner in which the sticks may be retained in the respective sockets, by employing suitable spring means.

In the accompanying drawings wherein for the purpose of illustration is shown a preferred embodiment of my invention, the device comprises a dipping frame designated as a whole by the numeral 10. This frame embodies in its construction end sills 11 and 12, which are recessed respectively at 13, 14 and 15. Adapted to connect the pair of sills are base boards 16, which are received in the lower recesses 15. Receivable within the upper recesses 13 and 14 are the extremities of a plurality of connecting strips or bars. These bars include side bars 17 and 18, respectively, while disposed between the side bars are a number of intermediate bars 19.

From a consideration of Fig. 1, it will be noted that the side bars 17 and 18 are of a straight formation on their side faces, while on their inner faces there are formed semi-circular depressions 20. On each side face of the intermediate bars 19 there are likewise formed the semi-circular depressions and when the strips are assembled, as shown to advantage in Fig. 9, a plurality of complete circular depressions are provided.

In these depressions 20 I propose to insert the lower ends of "sucker" sticks 21, which have mounted thereon an accumulation of candy 22 prior to the dipping of the same in a vat or receptacle, (not shown).

As shown to advantage in Fig. 7, the intermediate bars 19 and likewise the side bars 17 and 18 are reduced at the ends in order that they may readily be received in the recesses 13 and 14 of the frame 10. While it will be apparent that due to the formation of the recesses the extremities of the strips will have sufficient play therein, yet they are retained in a fixed position in the recesses when the frame is completely assembled. The means for retaining the bars 19 in position comprises top boards 23, which are detachably secured by fastening elements 24 to the top surface of the sills 11 and 12.

In order that the sticks 21 may be retained and held in a fixed position in the depressions 20 and between the respective parallel bars 19, I have provided elongated bolts 25, adapted to be inserted through transverse apertures 26, bored in the side faces of the plurality of strips. From a consideration of Figures 3 and 8, it will be noted that the elongated bolts 25 are threaded adjacent their extremities, in order to receive thereon wing nuts 27. The purpose of the elongated bolts and nuts being to bind the sticks 21 between the strips 17, 18 and 19, in order that the frame 10 may be moved as a unit without danger of the sticks falling from the same.

In Fig. 9 there is shown a modified form that may be employed for positively retaining the sticks 21 in the depressions 20 to assure the operator against accidental displacement of the sticks. This means comprises spring tongues 28, which are secured at one end to the top of the bars and contact adjacent their opposite ends with the sticks 21.

From the peculiar construction of the end sills, it will be apparent that hand holds 29 are provided, in order that when the frame is suspended over a vat, one or more operators can readily grasp the frame.

In Figures 3 and 8 I have shown means for causing the respective cross bars to always be in close proximity to each other, and in order to accomplish this result the bars 18 are counterbored as at 29 and coil springs 30 are adapted to encircle the bolts 25. It will be apparent that the respective extremities of the springs 30 will contact with the counterbored end of the bars and the extensions 31 of the wing nuts 27. Thus when one of the candy sticks is inserted in a depression the spring construction just described will serve to return the bars to their normal position and thus tightly grip the sticks.

In the use of my device the plurality of sticks 21, which have formed thereon the unfinished suckers are inserted in the depressions 20, formed by the parallel sticks. After this has been accomplished, the wing nuts 27 are tightened on the elongated bolts which penetrate the respective strips and a binding action takes place, whereby the sticks 21 are retained in position against accidental displacement. The frame 10 is then manually moved as a unit, next inverted, and either positioned above or rested upon the edge of the vat before referred to, in which there is contained a quantity of the coating material to be accumulated on the unfinished suckers. When this step has been accomplished, the frame 10 is removed intact from its position on the vat and by the unscrewing of the wing nuts, and consequent lateral freedom of movement given to the bars the finished suckers are allowed to drop upon a suitable receiving table. The above mentioned operation is again repeated for the purpose of forming a new lot of articles.

For the purpose of assuring a tight wedging of the sticks in the depressions, I propose to assemble the sticks in parallel relation, then bore holes at the desired points of contact of the bars and next plane the respective side surfaces of the bars. This construction is disclosed to advantage in Fig. 6, wherein the dotted lines indicate the length of the bars to be planed to make the openings elliptical in shape to thus assure the desired wedging action.

From the detailed description of my invention it will be apparent that I have set forth a device that will fulfil a long needed want in the candy trade, and a device which will accomplish the formation of a great quantity of the articles referred to in a minimum amount of time and with small effort on the part of the operator.

It is understood that the form of my invention herewith shown and described, is to be taken as a preferred example of the same, and that various changes in the shape, size and arrangement of parts may be resorted to without departing from the spirit of the invention of the scope of the subjoined claims.

Having thus described my invention, I claim:—

1. A device of the character described comprising end sills, parallel cross bars having depressions formed therein to receive a plurality of sticks and adapted to be positioned in said sills, and clamping means secured to said cross bars to compress the latter, whereby the sticks positioned therein are retained in a fixed position.

2. A device of the character described comprising recessed end sills, a plurality of parallel cross bars being apertured in their side faces and having reduced extremities positioned in the recesses of said sills the width of the assembled bars being narrower than the recessed portions of the sills, and clamping means penetrating said cross bars for retaining in a fixed position sticks resting in depressions formed in said bars.

3. A device of the character described comprising recessed end sills, a plurality of cross bars being apertured in their side faces and having reduced extremities positioned in the recesses of said sills, the width of the assembled bars being narrower than the recessed portions of the sills, top boards secured to said sills for retaining the cross bars therein, and clamping means penetrating said apertured cross bars for retaining in a fixed position sticks resting in depressions formed in said bars.

4. A device of the character described comprising recessed end sills, a plurality of cross bars being apertured in their side faces and having reduced extremities positioned in the recesses of said sills, the width of the assembled bars being narrower than the recessed portions of the sills, top boards secured to said sills for retaining the cross bars therein, and clamping means penetrating said apertured cross bars for retaining in a fixed position sticks resting in depressions formed in said bars, said means comprising elongated bolts penetrating the aperture of said bars, and wing nuts detachably secured on said bars.

In testimony whereof I affix my signature.

ISAAC ANDERSON.